(12) United States Patent
Baba

(10) Patent No.: US 12,259,052 B2
(45) Date of Patent: Mar. 25, 2025

(54) VALVE MEMBER

(71) Applicant: SUMITOMO ELECTRIC FINE POLYMER, INC., Osaka (JP)

(72) Inventor: Masato Baba, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 187 days.

(21) Appl. No.: 18/009,730

(22) PCT Filed: Mar. 16, 2021

(86) PCT No.: PCT/JP2021/010648
§ 371 (c)(1),
(2) Date: Dec. 11, 2022

(87) PCT Pub. No.: WO2021/256029
PCT Pub. Date: Dec. 23, 2021

(65) Prior Publication Data
US 2023/0220922 A1     Jul. 13, 2023

(30) Foreign Application Priority Data
Jun. 17, 2020    (JP) ................. 2020-104873

(51) Int. Cl.
*F16K 25/00*     (2006.01)
*C08L 27/18*     (2006.01)

(52) U.S. Cl.
CPC ............ *F16K 25/005* (2013.01); *C08L 27/18* (2013.01); *C08L 2312/02* (2013.01)

(58) Field of Classification Search
None
See application file for complete search history.

(56) References Cited

U.S. PATENT DOCUMENTS

| 2007/0042190 | A1 | 2/2007 | Yamada et al. |
| 2014/0070128 | A1 | 3/2014 | Hayashi et al. |
| 2016/0118676 | A1 | 4/2016 | Shima et al. |
| 2016/0379734 | A1* | 12/2016 | Shih ............... C08K 5/0025 427/501 |
| 2017/0292622 | A1 | 10/2017 | Hayashi et al. |

FOREIGN PATENT DOCUMENTS

| JP | 2005-114140 A | 4/2005 |
| JP | 2014-052036 A | 3/2014 |
| JP | 2016-085627 A | 5/2016 |
| JP | 2017-190872 A | 10/2017 |
| JP | 2019-35036 A | 3/2019 |
| JP | 2019-199926 A | 11/2019 |

* cited by examiner

*Primary Examiner* — Ramsey Zacharia
(74) *Attorney, Agent, or Firm* — Renner, Otto, Boisselle & Sklar, LLP

(57) ABSTRACT

The valve member according to one embodiment of the present disclosure is a resin formed product having a cross-linked ethylene-tetrafluoroethylene copolymer as a main component, and having a crosslinking density of 85.0 mol/m$^3$ or more calculated from a storage modulus at 300° C.

2 Claims, 2 Drawing Sheets

VALVE MEMBER

TECHNICAL FIELD

The present disclosure relates to a valve member. The present application claims priority based on Japanese Patent Application No. 2020-104873 filed Jun. 17, 2020, and all descriptions in the above Japanese application are entirely incorporated by reference herein.

BACKGROUND ART

A valve such as a gate valve, a glove valve, a ball valve, a check valve, a regulating valve, and a sealing valve, has a valve element and a valve seat, and performs opening and closing by sliding, pressing, and the like of the valve element against the valve seat.

As a valve member such as the valve seat like this, a resin which is an elastic body has been adopted in recent years. For example, in a conventional fluidic control valve, proposed is a technology for improving a sealing property and durability by forming a resin coating film made of a tetrafluoroethylene·perfluoroalkoxyethylene copolymer on a contact surface against the valve seat, through an adhesion layer such as a primer against a metal base body of the valve element (referred to Patent Literature 1).

CITATION LIST

Patent Literature

PTL 1: Japanese Patent Laying-Open No. 2014-052036.

SUMMARY OF INVENTION

A valve member according to one embodiment of the present disclosure is a resin formed product having a crosslinked ethylene-tetrafluoroethylene copolymer as a main component, and having a crosslinking density of 85.0 mol/m³ or more calculated from a storage modulus at 300° C.

DETAILED DESCRIPTION

Figure 1:
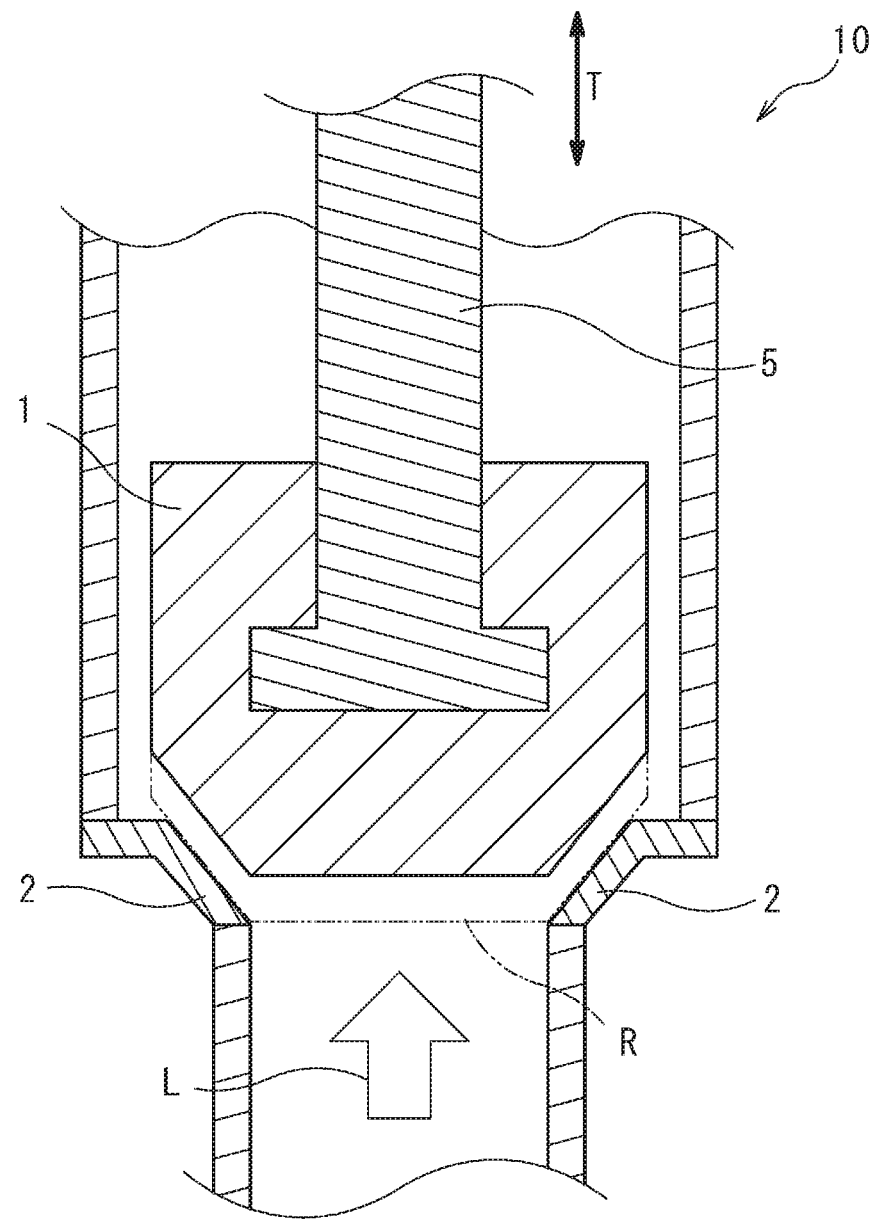
FIG. 1 is a schematic cross-sectional view showing a valve member according to one embodiment of the present disclosure.

Problem to be Solved by the Present Disclosure

In the case of the above conventional technology, if creep damage and the like are caused in the above resin layer due to usage for long periods of time, there is a risk that functions of the valve such as the sealing property are reduced due to deformation. Further, in case that the above resin layer is laminated on the metal base body, there is a risk that the adhesion layer which becomes an undercoat of the above resin layer is exposed, to flow out as contaminants.

The present disclosure is made based on such a circumstance, and an objective of the present disclosure is to provide a valve member which is difficult to plastically deform even in usage for long periods of time and excellent in durability.

Advantageous Effect of the Present Disclosure

The valve member of the present disclosure is difficult to plastically deform in the usage for long periods of time and excellent in the durability.

DESCRIPTION OF EMBODIMENTS

First, embodiments of the present disclosure will be listed and described.

A valve member according to one embodiment of the present disclosure is a resin formed product having a crosslinked ethylene-tetrafluoroethylene copolymer as a main component, and having a crosslinking density of 85.0 mol/m³ or more calculated from a storage modulus at 300° C.

Since the valve member is the resin formed product having the crosslinked ethylene-tetrafluoroethylene copolymer as the main component, it can be integrally formed. Further, the crosslinking density calculated from the storage modulus at 300° C. of the valve member is 85.0 mol/m³ or more, thereby improving creep resistance and wear resistance. The above "crosslinked ethylene-tetrafluoroethylene copolymer" is one obtained by crosslinking of an ethylene-tetrafluoroethylene copolymer by irradiation with an electron beam. The "crosslinking density calculated from the storage modulus at 300° C." can be calculated from the following expression (1) by using the storage modulus E' [Pa] obtained by means of solid viscoelastic measurement in a temperature range of room temperature to 300° C. under the condition of a frequency of 10 Hz and a temperature elevation rate of 5° C./minute, $$n = E'/2(1+\mu)RT \tag{1}$$

wherein n is the crosslinking density [mol/m³]; E' is the storage modulus at 300° C.; µ is a Poisson's ratio (assuming 0.5); R is 8.314 J/mol·K of a gas constant; and T is 573K which is the absolute temperature of 300° C.

From behavior of the storage modulus E' in the above solid viscoelastic measurement, in a region of about 270° C. to 300° C., there is no occurrence of flow due to a temperature, and the behavior of rubber elasticity which the storage modulus E' is slightly increased with a temperature is shown. From this, it is speculated that this region means a crosslinking component and the crosslinking density calculated from the storage modulus E' at 300° C. reflects a degree of crosslinking.

In the formed product having the ethylene-tetrafluoroethylene copolymer as the main component, a change of relative positional relationship of polymer chains likely occurs due to external force, thereby causing plastic deformation easily. In the resin formed product having the crosslinked ethylene-tetrafluoroethylene copolymer as the main component, the change of the relative positional relationship of the polymer chains is not likely to occur due to the external force because the polymer chains are mutually crosslinked by irradiation with an electron beam, as well as being difficult to cause the plastic deformation and excellent in the durability. Therefore, the valve member having the above crosslinking density of 85.0 mol/m³ or more is difficult to plastically deform even in usage for long periods of time and excellent in the durability. Furthermore, it has corrosion resistance compared with the valve member provided with the metal base body.

It is preferable that the valve member be a valve element, a valve seat or a combination thereof. As the valve member, by adopting the valve element, the valve seat or the combination thereof, which are resin formed products having the crosslinked ethylene-tetrafluoroethylene copolymer as the main component, the integrated forming of the valve element, the valve seat or the combination thereof is possible, as well as improving creep resistance and wear resistance. Therefore, the valve element, the valve seat or the combination thereof are difficult to plastically deform even in the usage for long periods of time, and excellent in the durability. Further, the valve element, the valve seat or the combination thereof are the resin formed products having the crosslinked ethylene-tetrafluoroethylene copolymer as the main component, thereby achieving simplification of manufacturing processes of the valve and cut of manufacturing costs.

It is preferable that a creep strain after holding at 23° C. for 100 hours under a pressure of 13.7 MPa be 8.0% or less. The above creep strain of the valve member in a range described above achieves the valve member excellent in the creep resistance and the wear resistance.

In the present disclosure, the "main component" is a component of which a content is the largest, e.g., the component having the content of 51% by mass or more. The "creep strain (strain ratio)" is a value measured on the condition of 17.3 MPa of the pressure in accordance with JIS-K7181 (2011), "Plastics—Determination of compressive properties".

Details of Embodiments of The Present Disclosure

With reference to figures, hereinafter, preferable embodiments of the present disclosure will be described.

<Valve Member>

The valve member is a member that constitutes a valve that controls going in and out of liquid, gas, powder, etc. passing through a pipe by opening and closing a flow path. Namely, the valve can perform, for example, passing through, sealing, and controlling a flow rate, of fluid of water, air, a gas, etc., in a pipe. FIG. 1 is a schematic cross-sectional view showing the valve member according to one embodiment of the present disclosure. A valve device 10 is a gate valve that performs opening and closing by the valve element dividing a pass way of the fluid. Valve device 10 has a valve shaft 5, a valve element 1 provided on a head of valve shaft 5 and a valve seat 2. Valve element 1 performs closure of a cylindrical flow path in which fluid L flows, and flow adjustment. Valve seat 2 is a member of a side which receives above valve element 1 moving up and down for such as flow control. In valve device 10, valve shaft 5 moves up and down as indicated with an arrow T by drive mechanism not shown in figure, and valve element 1 comes down to an imaginary line R and presses or slides against valve seat 2, to perform the opening and closing. The valve member specifically includes a member constituting the valve of, e.g., valve element 1, valve seat 2, valve shaft 5, etc.

The valve member is the resin formed product having the crosslinked ethylene-tetrafluoroethylene copolymer as the main component. The valve member of the resin formed product having the crosslinked tetrafluoroethylene copolymer as the main component achieves the integrated forming, as well as improving the creep resistance and the wear resistance. Therefore, the valve member is difficult to plastically deform even in the usage for long periods of time, and excellent in the durability. Furthermore, comparing with the valve member having the metal base body, it has corrosion resistance. The above ethylene-tetrafluoroethylene copolymer (ETFE) is a fluorine resin in which ethylene ($C_2H_4$) and tetrafluoroethylene ($C_2F_4$) are polymerized. In addition, the above crosslinked ethylene-tetrafluoroethylene copolymer is one that the ethylene-tetrafluoroethylene copolymer is crosslinked by the irradiation with the electron beam.

In the case of the conventional fluidic control valve in which the resin layer is laminated on the metal base body, because of consumption of the above metal base body, there is a risk of spillage of contaminants due to metal particles. In the valve member of the resin formed product having the crosslinked ethylene-tetrafluoroethylene copolymer as the main component, however, there is no occurrence of the contaminants due to the metal particles.

Further, in the conventional fluidic control valve in which the resin layer is laminated on the metal base body of the valve element through the primer layer and the adhesive layer, when creep damage and the like are caused in the resin layer, there is a risk of spillage of contaminants due to exposure of the undercoating primer layer and the adhesive layer. However, the valve member of the resin formed product having the crosslinked ethylene-tetrafluoroethylene copolymer as the main component is difficult to plastically deform even in the usage for long periods of time, and able to suppress the creep damage. Furthermore, since the valve member does not need to have the primer layer and the adhesive layer, the occurrence of the contaminants due to the exposure of the primer layer and the adhesive layer can be fundamentally resolved.

In the conventional fluidic control valve, a fluorine-based resin is suitably used because it is excellent in heat resistance, corrosion resistance and low friction property. On the other hand, since the fluorine-based resin is poor in adhesion, even in the fluidic control valve in which the fluorine-based resin is laminated on the metal base body, the primer layer and the adhesive layer are needed as an undercoating, there being a risk that they become causes of the contamination as described above. However, the valve member of the resin formed product having the crosslinked ethylene-tetrafluoroethylene copolymer as the main component does not need to consider adhesiveness with the metal base body, and therefore can obtain durability which is equal or more than that of the valve member using the fluorine-based resin.

Since the whole valve member is made of only injection moldable resin as the material, it can provide holes and grooves having an arbitrary flow path cross sectional area in the injection molding process and does not go through a process that makes the flow path cross section change after the injection molding. On the other hand, in the valve member provided with the metal base body, when making the holes and the grooves for the fluid generated to pass through, the flow path cross sectional area of the holes and the grooves becomes smaller by covering the holes and the grooves with the resin layer. Therefore, though the valve member having the metal base body is unfavorable for larger flow rate, such a thing on the valve member described above does not happen.

A lower limit of the crosslinking density calculated from the storage modulus at 300° C. of the valve member is 85.0 mol/m$^3$, preferably 94.0 mol/m$^3$. When the above crosslinking density is less than the above lower limit, there is a risk that the creep resistance and the wear resistance of the valve member obtained is not sufficiently improved. In the formed product having the ethylene-tetrafluoroethylene copolymer as the main component, the change of the relative positional relationship of the polymer chains likely occurs due to the external force, thereby causing the plastic deformation easily. In the resin formed product having the crosslinked ethylene-tetrafluoroethylene copolymer as the main component, the change of relative positional relationship of the polymer chains is not likely to occur due to the external force because the polymer chains are mutually crosslinked by the irradiation with an electron beam, as well as being difficult to plastically deform and excellent in the durability. Therefore, the valve member having the crosslinking density of 85.0 mol/m$^3$ or more is difficult to plastically deform even in the usage for long periods of time and excellent in the durability. Further, an upper limit of the above crosslinking density of the valve member is not limited, but may be, e.g., 188 mol/m$^3$.

It is preferable that the valve member be capable to deform elastically. Capability of elastic deformation achieves good adhesion and excellent sealing property.

It is preferable that the valve member be the valve element, the valve seat or the combination thereof. As the valve member, by adopting the valve element, the valve seat or the combination thereof, which are resin formed products having the crosslinked ethylene-tetrafluoroethylene copolymer as the main component, the integrated forming of the valve element, the valve seat or the combination thereof is possible, as well as improving the creep resistance and the wear resistance. Therefore, the valve element, the valve seat or the combination thereof are difficult to plastically deform even in the usage for long periods of time, and excellent in the durability. Further, the valve element, the valve seat or the combination thereof are the resin formed products having the crosslinked ethylene-tetrafluoroethylene copolymer as the main component, thereby achieving the simplification of the manufacturing processes of the valve and the cut of the manufacturing costs.

Under the pressure of 13.7 MPa, an upper limit of the creep strain after holding at 23° C. for 100 hours (6,000 minutes) is preferably 8.0%. The valve member having the above creep strain of a range of described above achieves the valve member excellent in the creep resistance and the wear resistance.

A lower limit of a content of the crosslinked ethylene-tetrafluoroethylene copolymer in the valve member is preferably 51% by mass, more preferably 75% by mass, even more preferably 98% by mass, particularly preferably 100% by mass, i.e., a formed body after forming consists of only the crosslinked ethylene-tetrafluoroethylene copolymer. When the content of the above crosslinked ethylene-tetrafluoroethylene copolymer is less than the above lower limit, there is a risk that the creep resistance and the wear resistance of the valve member becomes insufficient.

In addition, within the scope not impairing the effects of the present invention, the resin component of the valve member may contain a polymer unit derived from other copolymerizable monomers in addition to the crosslinked ethylene-tetrafluoroethylene copolymer. The polymer unit of the copolymerizable monomer such as, e.g., perfluoro (alkyl vinyl ether), hexafluoropropylene, (perfluoroalkyl) ethylene, and chlorotrifluoroethylene may be contained. An upper limit of the content ratio of the polymer unit derived from the above other copolymerizable monomers is, e.g., 3% by mole, with respect to the total polymer units constituting the above crosslinked ethylene-tetrafluoroethylene copolymer.

Within the scope not impairing the objective of the present disclosure, the valve member may contain other components in addition to the crosslinked ethylene-tetrafluoroethylene copolymer.

(Sliding Agent)

By adding a sliding agent, a friction coefficient is reduced, to improve a sliding property. The sliding agent includes both of oil of a lubricating oil (machine oil) and the like, and a solid lubricant. It is preferable that the amount of the sliding agent blended be a range of 1 part by mass to 10 parts by mass per 100 parts by mass of the resin.

The above lubricating oil includes, paraffinic and naphthenic mineral oils such as a spindle oil, a refrigerating machine oil, a dynamo oil, a turbine oil, a machine oil, a cylinder oil, and a gear oil, and synthesized oils such as grease, a hydrocarbon, ester, polyglycol, polyphenylene ether, silicone, and halocarbons.

The above solid lubricant includes, polytetrafluoroethylene particles, molybdenum disulfide, graphite, silicone rubber, polyethylene, etc. As the polyethylene, preferable is ultrahigh molecular weight polyethylene having 2 million or more of molecular weight and about 3 μm to 40 μm of a particle diameter.

(Reinforcing Material)

By adding a reinforcing material, mechanical strength, the creep resistance, etc. can be improved. The reinforcing material includes a glass filler such as a glass fiber (fiberglass) and spherical glass, a carbon fiber, calcium carbonate, talc, silica, alumina, aluminum hydroxide, an inorganic whisker such as a basic magnesium sulfate whisker, a zinc oxide whisker and a potassium titanate whisker, and an inorganic filler such as montmorillonite and synthetic smectite. It is preferable that the amount of the reinforcing material blended be 5 parts by mass to 100 parts by mass per 100 parts by mass of the resin.

In general, it is preferable that the inorganic filler be the glass filer of chopped strands having about 1 mm to 3 mm of an average fiber length, since the filler of short fibers is the largest in effects increasing the elastic modulus. Also, since the glass fiber is made of glass, transparency of the formed body can be enhanced. Further, in case that the glass fiber is surface treated with a surface treatment agent, affinity of the polyolefin-based resin and the glass fiber is enhanced, further improving the transparency.

The above surface treatment agent includes, for example, a silane coupling agent and a titanium coupling agent with an alkyl chain having an amino group, a glycidyl group, a mercapto group, a vinyl group, an acryloxy group, or a methacryloxy group. Further, a crosslinking aid having a functional group, which reacts with the surface treatment agent, includes, for example, one having an amino group, a glycidyl group, a hydroxy group, an isocyanate group, a carboxy group, or a carbodiimide group.

(Antioxidant)

By adding an antioxidant, stability can be improved. The amount of the antioxidant blended is preferably 0.0005 parts by mass to 0.5 parts by mass, more preferably 0.001 parts by mass to 0.1 parts by mass, per 100 parts by mass of the resin.

The antioxidant includes, for example, one or a combination of two or more selected from the group consisting of 2,2'-methylene-bis[6-(1-methylcyclohexyl-p-cresol)], 2,2'-methylene-bis(4-ethyl-6-tert-butylphenol), 2,2'-methylene-bis(4-methyl-6-tert-butylphenol I), 4,4'-butylydenbis(3-methyl-6-tert-butylphenol), and 2,6-di-tert-butyl-p-cresol.

(Crosslinking Aid)

The crosslinking aid is blended to accelerate the crosslinking of the resin by irradiation with ionizing radiation. The amount of the crosslinking aid blended is changed depending on a type of the crosslinking aid, but normally, preferably 1 part by mass to 20 parts by mass, more preferably 2 parts by mass to 15 parts by mass, per 100 parts by mass of the resin.

The crosslinking aid includes: for example, oximes such as p-quinonedioxime, and p,p'-dibennzoylequinonedioxime; acrylates or methacrylates such as ethylene dimethacrylate, polyethylene glycol dimethacrylate, trimethylolpropanetrimethacrylate, cyclohexylmethacrylate, an acrylic acid/zinc oxide mixture, arylmethacrylate, and trimethacrylisocyanurate (hereinafter, also referred to as TMIC); vinyl monomers such as divinylbenzene, vinyltoluene, and vinylpyridine; allyl compounds such as hexamethylenediallylnadiimide, diallyl itaconate, diallylphthalate, diallylisophthalate, diallylmonoglycidyl isosyanurate, triallyl syanurate, and triallyl isosyanurate (hereinafter, also referred to as TAIC); maleimide compounds such as N,N'-m-phenylenebismaleimide, and N,N'-(4,4'-methylenediphenylene)dimaleimide. These crosslinking aids may be used alone, or in combination.

(Polyfunctional Monomer)

A polyfunctional monomer is a monomer having a molecular weight of 1,000 or less, and at least two or more of carbon-carbon double bonds in a molecular. The polyfunctional monomer having the molecular weight of 1,000 or less achieves to obtain the formed body excellent in the heat resistance while maintaining the transparency, to be compatible in these properties. Further, the molecular weight of 1,000 or less is also preferable in that there are many polyfunctional monomers themselves having less coloring in addition to a viscosity sufficient to allow easy kneading with the resin.

The above polyfunctional monomer includes, e.g., 1,6-hexanediol di(meth)acrylate, 1,4-butanediol di(meth)acrylate, trimethylolpropane tri(meth)acrylate, ethylene oxide modified trimethylolpropane tri(meth)acrylate, propylene oxide modified trimethylolpropane tri(meth)acrylate, ethylene oxide modified bisphenol A di(meth)acrylate, diethylene glycol di(meth)acrylate, dipentaerythritol hexa-acrylate, dipentaerythritol monohydroxy penta-acrylate, caprolactone modified dipentaerythritol hexa-acrylate, pentaerythritol tri(meth)acrylate, pentaerythritol tetra(meth)acrylate, polyethylene glycol di(meth)acrylate, tris(acryloxyethyl)isocyanurate, tris(methacryloxyethyl)isocyanurate, etc. Above all, listed are the tris(acryloxyethyl)isocyanurate, the tris(methacryloxyethyl)isocyanurate, the trimethylolpropane tri(meth)acrylate, etc.

As the above polyfunctional monomer, a commercially available polyfunctional monomer can be also used. In the commercially available polyfunctional monomer, however, since there is a case that a stabilizing agent and the like is contained to the extent that it affects to the effects of the present disclosure, it is preferable that a simple preliminary test and the like be performed on the effects of the present disclosure before usage, to confirm that it does not impact the effects of the present disclosure. As the above polyfunctional monomer, normally used is one of which the amount of the stabilizing agent blended is 1,000 ppm or less, and to prevent influences on the effects of the present disclosure, the less the amount blended is, the more preferable is.

The amount of the polyfunctional monomer blended is preferably 0.05 parts by mass or more and 20 parts by mass or less per 100 parts by mass of the resin. With less than 0.05 parts by mass, irradiation and crosslinking efficiency of the resin may be decreased, and it may be impossible to obtain sufficient heat resistance and light resistance stability. On the other hand, with more than 20 parts by mass, handling at the time of kneading may be difficult, and the additives may be bled out from the formed product. Also, the transparency may deteriorate due to self-polymerization of the additives themselves.

In addition to the above components, as long as not impairing the objective of the present disclosure, other components to be possible to add include, e.g., an ultraviolet absorber, a weathering stabilizer, a copper inhibitor, a flame retardant, a coloring agent, etc.

[Method for Manufacturing Valve Member]

A method for manufacturing the valve member comprises: forming by using a resin composition having an ethylene-tetrafluoroethylene copolymer as a main component; and irradiating the formed body obtained in the above forming with an electron beam.

In the method for manufacturing the above valve member, since the ethylene-tetrafluoroethylene copolymer is the main component and the ethylene-tetrafluoroethylene copolymer is crosslinked by irradiation with the electron beam, produced can be the valve member, in which the creep resistance and the wear resistance are improved, to be difficult to plastically deform even in the usage for long periods of time, and which is excellent in the durability.

(Forming)

In the forming process, as described above, the resin composition having the ethylene-tetrafluoroethylene copolymer as the main component is formed into a shape of the member used as the valve member.

The method for forming the above resin composition is not limited, and known methods such as extrusion, injection molding, and machining process can be used. As the forming method in the forming process, injection molding is preferable. Since the ethylene-tetrafluoroethylene copolymer is used as the main component in the above manufacturing method of the valve member, it does not need to be a melting state at manufacturing, and the formed body is difficult to deform. Therefore, in the manufacturing method of the valve member, the formed body can be in a desired valve member shape in advance. Also, since the deformation in a process of irradiation with an electron beam can be suppressed in the manufacturing method of the valve member, it does not need to form or adjust to the desired shape after irradiation with the electron beam, to further enhance the manufacturing efficiency.

<Irradiation with Electron Beam>

In the process of irradiation with an electron beam, the formed body obtained in the forming process as described above is irradiated with an electron beam.

The ethylene-tetrafluoroethylene copolymer constituting the above formed body is irradiated with the electron beam. By this irradiation with the electron beam, the crosslinking of the ethylene-tetrafluoroethylene copolymer progresses, to capable to enhance the creep resistance and the wear resistance of the valve member obtained.

An atmospheric temperature in the process of irradiation with an electron beam can be normal temperature or more and a melting point or less. Therefore, the manufacturing efficiency of the manufacturing method of the valve member can be more enhanced.

Further, in the process of irradiation with an electron beam, the irradiation with the electron beam can be also performed in the atmosphere. Therefore, since it does not need equipment adjusting the atmosphere, and energy, to further enhance the manufacturing efficiency.

In the process of irradiation with an electron beam, a lower limit of dose of the electron beam is preferably 220 kGy, more preferably 240 kGy. On the other hand, an upper limit of the dose of the above electron beam is not limited, but preferably 480 kGy. When the dose of the above electron beam is less than the above lower limit, there is a risk that the creep resistance and the wear resistance of the valve member obtained are not sufficiently improved. On the other hand, when the dose of the above electron beam is more than the above upper limit, there is a risk that cost-effectiveness of the irradiation with an electron beam is not sufficiently obtained.

In case that the shape of the formed body obtained in the forming process is a part shape used as the valve member, and a condition of irradiation with electron beam in the process of irradiation with an electron beam is not the melting state, the desired valve member can be obtained by this irradiation of electron beam. On the other hand, in other than the above case, forming or adjusting, to the desired shape is performed as needed after irradiation with the electron beam.

According to the valve member, since it can be integrally formed, as well as improving the creep resistance and the wear resistance, it is difficult to plastically deform even in the usage for long periods of time and excellent in the durability.

Other Embodiments

Embodiments disclosed at this time should be considered, in all respects, to be examples and not restrictive. The scope of the present disclosure is not limited to the structures of the above embodiments, and is established by claims, and intended to contain meanings equivalent to the claims and all of modifications in the scope.

In the above embodiments, though explained is the case that the irradiation with the electron beam in the process of irradiation with an electron beam is performed under the condition of not an oxygen-free atmosphere and not the melting state, the above conditions can be changed to the oxygen-free atmosphere and the melting state. Alternatively, a condition of the oxygen-free atmosphere, but not the melting state, and a condition of not the oxygen-free atmosphere, but the melting state, contrarily, can be also selected.

EXAMPLES

Hereinafter, the present disclosure will be described in further details with reference to examples, but the present disclosure is not limited to these examples.

No. 1 to No. 5

As a test sample, using the resin composition consisting of the ethylene-tetrafluoroethylene copolymer (ETFE), a ETFE resin piece of 8 mm×10 mm×16 mm and a thickness of 16 mm was formed by machining forming. Next, the ETFE resin piece of this formed body was irradiated with the electron beam at a dose shown in Table 1. The conditions of irradiation with the electron beam were an air atmosphere, and normal temperature without heating and cooling. In this manner, the ETFE resin pieces of No. 1 to No. 5 were obtained.

No. 6 to No. 7

Using the resin composition consisting of the polytetrafluoroethylene (PTFE) with no irradiation as test sample No. 6 and using the resin composition consisting of the tetrafluoroethylene-perfluoro alkyl vinyl ether copolymer (PFA) with no irradiation as test sample No. 7, the resin pieces of 8 mm×10 mm×16 mm and the thickness of 16 mm were formed by the machining forming.

Evaluation (Crosslinking Density Calculated from Storage Modulus at 300° C.)

The ETFE resin pieces of the above No. 1 to No. 5 were heat treated in an oven at a temperature of 50° C. for 1 hour, and after heat treatment, by cutting the power supply of the oven and cooling them spontaneously to room temperature, anneal treatment before measurement was performed. With respect to samples obtained, measurement of the storage modulus E was performed under the following conditions.

Solid Viscoelasticity Measurement Conditions

Apparatus: Dynamic Viscoelastic Measurement Apparatus Rheogel E-4000 (Manufactured by K.K. UBM)
Jig: tensile
Temperature: room temperature to 300° C., 5° C./minute temperature elevation
Flow rate of nitrogen: 6 L/minute
Frequency: 10 Hz Then, the storage modulus E' at the temperature of 300° C. was obtained, to calculate the crosslinking density [mol/$m^3$] based on the above expression (1).

(Creep Strain)

Figure 2:
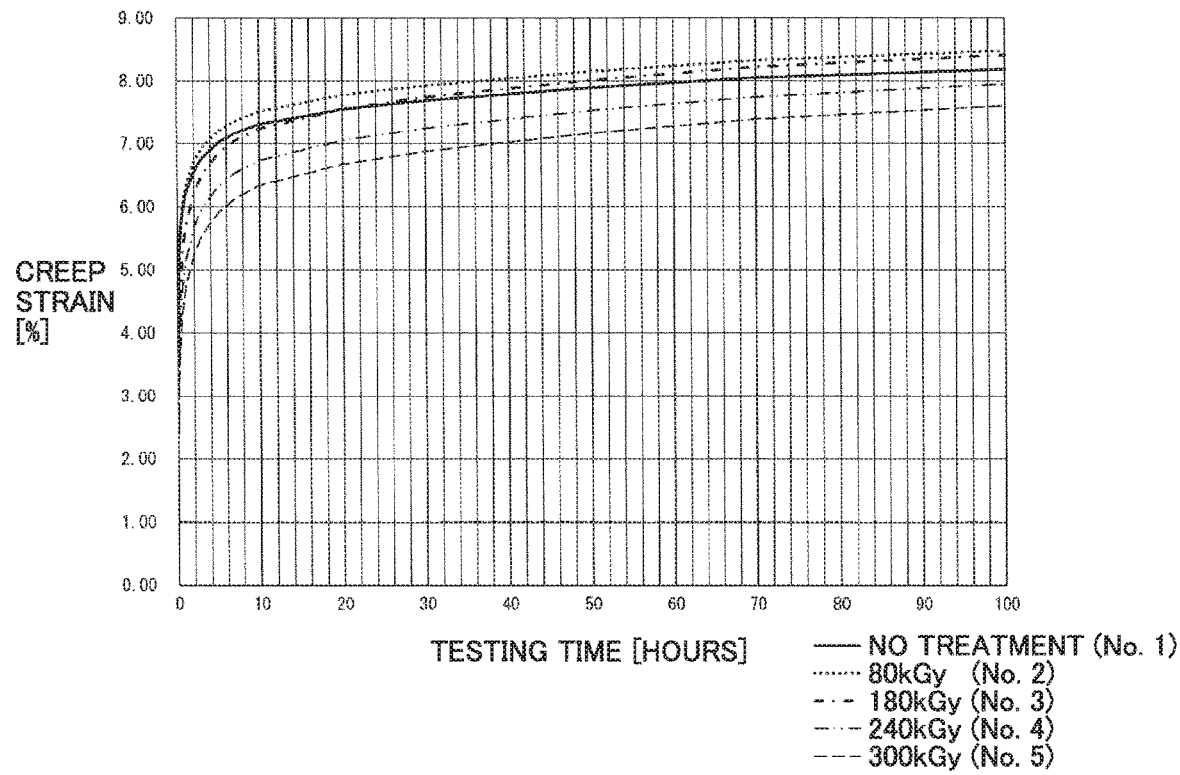
FIG. 2 is a graph showing relationships between a testing time and a ratio of a creep strain in Examples.
Figure 3:
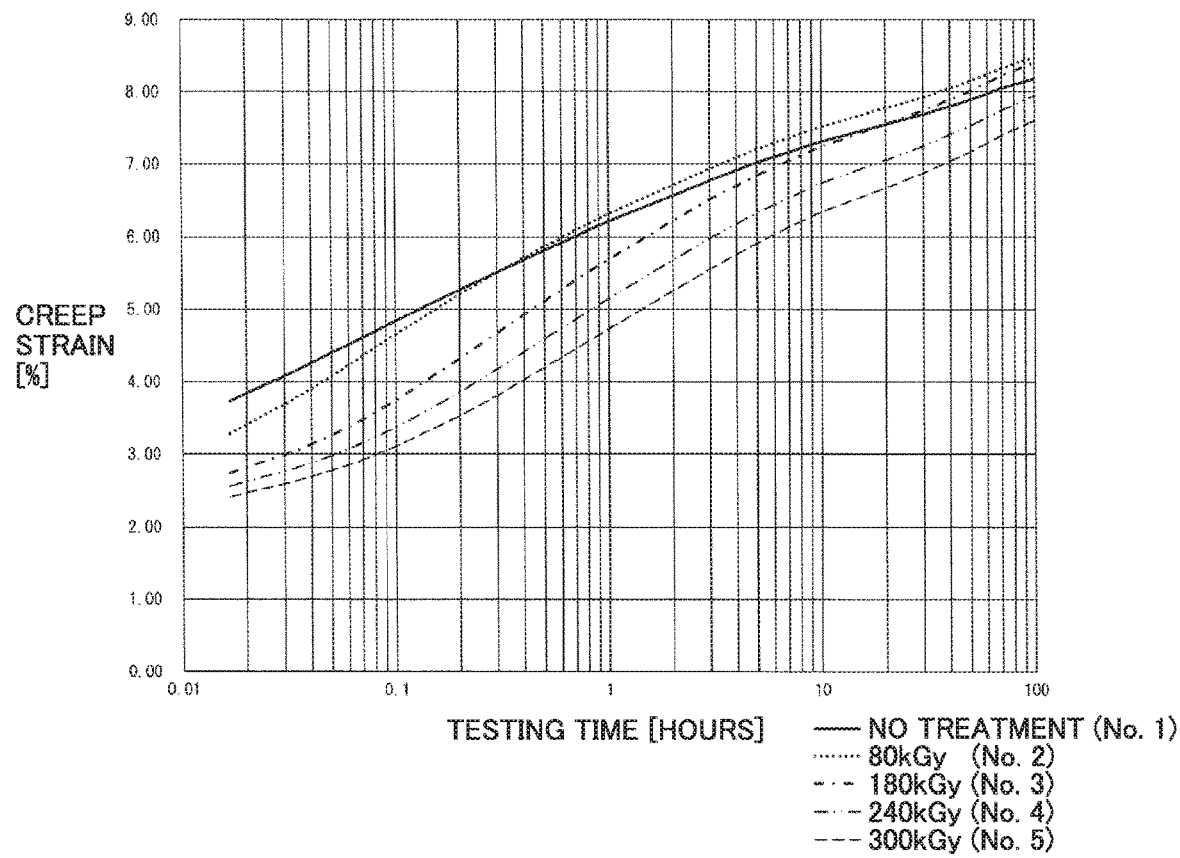
FIG. 3 is a semilogarithmic graph showing the relationships between the testing time and the ratio of the creep strain in Examples.

With respect to the resin pieces of No. 1 to No. 5 obtained, the creep strain after holding at 23° C. for 100 hours under the pressure of 13.7 MPa was measured in accordance with JIS-K7181 (2011), "Plastics—Determination of compressive properties". The measurement of the creep strain was performed by using a creep testing machine (manufactured by A&D Company, Limited, "CPS-L-200"). The evaluating results are shown in Table 1. Further, in FIGS. 2 and 3, shown are relationships between a testing time and a ratio of the creep strain in the resin pieces of No. 1 to No. 5. Still, FIG. 3 is a graph showing the testing time in a logarithm on the horizontal axis. "Creep strain [%]" shown in the vertical axis of FIGS. 2 and 3 is a ratio of a displacement [mm] of strain in each testing time to a thickness [mm] before applying pressure of test pieces (No. 1 to No. 5). Furthermore, in Table 2, shown are measurement results of the creep strain of 100 hours of the testing time in the resin pieces of No. 1 to No. 7.

TABLE 1

| | | Evaluation Item | | | | | | | | | |
|---|---|---|---|---|---|---|---|---|---|---|---|
| | | Creep Displacement [mm] | | | | | Creep Strain [%] | | | | |
| | | Test No. | | | | | | | | | |
| | | No. 1 | No. 2 | No. 3 | No. 4 | No. 5 | No. 1 | No. 2 | No. 3 | No. 4 | No. 5 |
| Dose [kGy] | | No Irradiation | 80 | 180 | 240 | 300 | No Irradiation | 80 | 180 | 240 | 300 |
| Crosslinking Density [mol/$m^3$] | | — | 34.5 | 75.2 | 94.0 | 116.4 | — | 34.5 | 75.2 | 94.0 | 116.4 |

TABLE 1-continued

| | | Evaluation Item | | | | | | | | |
|---|---|---|---|---|---|---|---|---|---|---|
| | | Creep Displacement [mm] | | | | | Creep Strain [%] | | | |
| | | Test No. | | | | | | | | |
| | | No. 1 | No. 2 | No. 3 | No. 4 | No. 5 | No. 1 | No. 2 | No. 3 | No. 4 | No. 5 |
| Testing Time | 1 minute | 0.60 | 0.52 | 0.44 | 0.41 | 0.39 | 3.73 | 3.28 | 2.74 | 2.56 | 2.41 |
| | 2 minutes | 0.66 | 0.60 | 0.49 | 0.45 | 0.42 | 4.14 | 3.76 | 3.03 | 2.80 | 2.62 |
| | 3 minutes | 0.70 | 0.65 | 0.52 | 0.48 | 0.44 | 4.40 | 4.07 | 3.26 | 2.98 | 2.77 |
| | 4 minutes | 0.73 | 0.69 | 0.55 | 0.50 | 0.46 | 4.58 | 4.32 | 3.44 | 3.13 | 2.89 |
| | 6 minutes | 0.77 | 0.74 | 0.60 | 0.54 | 0.50 | 4.84 | 4.65 | 3.74 | 3.36 | 3.10 |
| | 12 minutes | 0.84 | 0.83 | 0.69 | 0.62 | 0.56 | 5.27 | 5.21 | 4.32 | 3.86 | 3.53 |
| | 18 minutes | 0.88 | 0.88 | 0.75 | 0.67 | 0.61 | 5.51 | 5.51 | 4.67 | 4.17 | 3.81 |
| | 30 minutes | 0.93 | 0.94 | 0.82 | 0.73 | 0.67 | 5.81 | 5.86 | 5.11 | 4.59 | 4.19 |
| | 42 minutes | 0.96 | 0.97 | 0.86 | 0.78 | 0.71 | 6.01 | 6.09 | 5.40 | 4.86 | 4.46 |
| | 1 hour | 0.99 | 1.01 | 0.91 | 0.82 | 0.76 | 6.21 | 6.31 | 5.69 | 5.15 | 4.73 |
| | 2 hours | 1.05 | 1.07 | 0.99 | 0.91 | 0.84 | 6.56 | 6.71 | 6.21 | 5.68 | 5.25 |
| | 3 hours | 1.08 | 1.11 | 1.04 | 0.96 | 0.89 | 6.77 | 6.94 | 6.51 | 5.98 | 5.55 |
| | 5 hours | 1.12 | 1.15 | 1.09 | 1.01 | 0.95 | 7.02 | 7.21 | 6.85 | 6.33 | 5.91 |
| | 7 hours | 1.14 | 1.18 | 1.13 | 1.04 | 0.98 | 7.16 | 7.36 | 7.04 | 6.53 | 6.12 |
| | 10 hours | 1.17 | 1.20 | 1.16 | 1.08 | 1.01 | 7.31 | 7.52 | 7.24 | 6.73 | 6.34 |
| | 20 hours | 1.21 | 1.24 | 1.21 | 1.13 | 1.07 | 7.55 | 7.78 | 7.55 | 7.05 | 6.67 |
| | 30 hours | 1.23 | 1.27 | 1.24 | 1.16 | 1.10 | 7.69 | 7.92 | 7.74 | 7.25 | 6.87 |
| | 50 hours | 1.26 | 1.30 | 1.28 | 1.20 | 1.15 | 7.89 | 8.15 | 8.01 | 7.53 | 7.17 |
| | 70 hours | 1.29 | 1.33 | 1.31 | 1.24 | 1.18 | 8.05 | 8.32 | 8.22 | 7.74 | 7.39 |
| | 100 hours | 1.31 | 1.36 | 1.34 | 1.27 | 1.22 | 8.18 | 8.48 | 8.41 | 7.95 | 7.60 |

TABLE 2

| Test No. | No. 1 | No. 2 | No. 3 | No. 4 | No. 5 | No. 6 | No. 7 |
|---|---|---|---|---|---|---|---|
| Resin Type | ETFE | | | | | PTFE | PFA |
| Dose of Electron Beam [kGy] | No Irradiation | 80 | 180 | 240 | 300 | No Irradiation | No Irradiation |
| Crosslinking Density [mol/m$^3$] [mol/m$^3$] | — | 34.5 | 75.2 | 94.0 | 116.4 | — | — |
| Creep Strain at 100 Hours of Testing Time [%] | 8.2 | 8.5 | 8.4 | 8.0 | 7.6 | 15.0 | 8.0 |

From the results of Table 1, FIG. 2 and FIG. 3, in No. 4 to No. 5 of which the crosslinking density calculated from the storage modulus at 300° C. is 85.0 mol/m$^3$ or more, the creep strain after testing of 100 hours is 8.0% or less, to obtain favorable results compared with No. 1 in which the electron crosslinking was not performed and No. 2 to No. 3 of which the above crosslinking density is less than 85.0 mol/m$^3$.

Further, from the results of Table 2, in No. 4 to No. 5 of which the crosslinking density is 85.0 mol/m$^3$ or more, the favorable results were obtained in the creep strain after 100 hours of testing time compared with No. 6 consisting of PTFE and No. 7 consisting of PFA.

From the above, it is found that the valve member is improved in the creep resistance and the wear resistance and excellent in durability by setting the main component to the crosslinked ethylene-tetrafluoroethylene copolymer having the crosslinking density of the above 85.0 mol/m$^3$ or more.

REFERENCE SIGNS LIST

1 Valve element (valve member)
2 Valve seat (valve member)
5 Valve shaft (valve member)
10 Valve device
L Fluid
R Imaginary line
T Arrow

The invention claimed is:

1. A valve member consisting of a resin formed product, the resin formed product comprising a crosslinked ethylene-tetrafluoroethylene copolymer as a main component and having a crosslinking density of 85.0 mol/m$^3$ or more calculated from a storage modulus at 300° C. wherein the valve member is a valve element, a valve seat or a combination thereof.

2. The valve member according to claim 1, wherein the resin formed product has a creep strain after being held at 23° C. for 100 hours under a pressure of 13.7 MPa, of 8.0% or less.

* * * * *